(12) United States Patent
Takeshita et al.

(10) Patent No.: US 6,213,379 B1
(45) Date of Patent: Apr. 10, 2001

(54) FRICTION PLUG WELDING

(75) Inventors: Riki Takeshita, Slidell; Terry L. Hibbard, Kenner, both of LA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/141,294

(22) Filed: Aug. 26, 1998

Related U.S. Application Data

(60) Provisional application No. 60/057,111, filed on Aug. 27, 1997, now abandoned, and provisional application No. 60/077,296, filed on Mar. 6, 1998, now abandoned.

(51) Int. Cl.$^7$ .......................... B23K 20/12; B23K 31/02; B23K 1/06; B23K 5/20; B23K 37/00

(52) U.S. Cl. .................. 228/112.1; 228/113; 228/114; 228/114.5; 228/1.1; 228/2.1

(58) Field of Search ................. 228/112.1, 113, 228/114, 114.5, 2.1, 1.1

(56) References Cited

U.S. PATENT DOCUMENTS

| | | |
|---|---|---|
| 3,234,643 | 2/1966 | Hollander . |
| 3,495,321 | 2/1970 | Shaff et al. . |
| 3,848,389 | 11/1974 | Gapp et al. . |
| 3,853,258 | 12/1974 | Louw et al. . |
| 3,973,715 | 8/1976 | Rust . |
| 4,059,214 * | 11/1977 | Weissmann ................... 228/265 |
| 4,087,038 | 5/1978 | Yagi . |
| 5,460,317 | 10/1995 | Thomas et al. . |
| 5,469,617 * | 11/1995 | Thomas et al. ................... 29/889.21 |
| 5,529,333 * | 6/1996 | Rizzi et al. ................... 280/737 |
| 5,718,366 | 2/1998 | Colligan . |
| 5,971,252 * | 10/1999 | Rosen et al. ................... 228/112.1 |
| 5,975,406 * | 11/1999 | Mahoney et al. ................... 228/112.1 |

FOREIGN PATENT DOCUMENTS

| | | |
|---|---|---|
| 447084 | 5/1929 | (DE) . |
| 575566 | 2/1946 | (GB) . |
| 2306365 * | 7/1997 | (GB) ................... 228/112.1 |
| 660801 | 5/1979 | (SU) . |

OTHER PUBLICATIONS

"New Process to Cut Underwater Repair Costs", TWI Connect, No. 29, Jan. 1992.

"Innovator's Notebook", Eureka Transfer Technology, Oct. 1991, p. 13.

"Repairing Welds With Friction–Bonded Plugs", NASA Tech. Briefs, Sep. 1996, p. 95.

"Repairing Welds With Friction–Bonded Plugs", Technical Support Package, NASA Tech. Briefs, MFS–30102.

"2195 Aluminum–Copper–Lithium Friction Plug Welding Development," AeroMat '97 Abstract.

"Welding, Brazing and Soldering", Friction welding section: "Joint Design", "Conical Joints", Metals Handbook: Ninth Edition, vol. 6, pp. 719–738.

* cited by examiner

*Primary Examiner*—Patrick Ryan
*Assistant Examiner*—Zidia T. Pittman
(74) *Attorney, Agent, or Firm*—Garvey, Smith, Nehrbass & Doody, L.L.C.

(57) ABSTRACT

Friction plug welding (FPW) usage is advantageous for friction stir welding (FSW) hole close-outs and weld repairs in 2195 Al—Cu—Li fusion or friction stir welds. Current fusion welding methods of Al—Cu—Li have produced welds containing varied defects. These areas are found by non-destructive examination both after welding and after proof testing. Current techniques for repairing typically small (<0.25") defects weaken the weldment, rely heavily on welders' skill, and are costly. Friction plug welding repairs increase strength, ductility and resistance to cracking over initial weld quality, without requiring much time or operator skill. Friction plug welding while pulling the plug is advantageous because all hardware for performing the weld can be placed on one side of the workpiece.

13 Claims, 14 Drawing Sheets

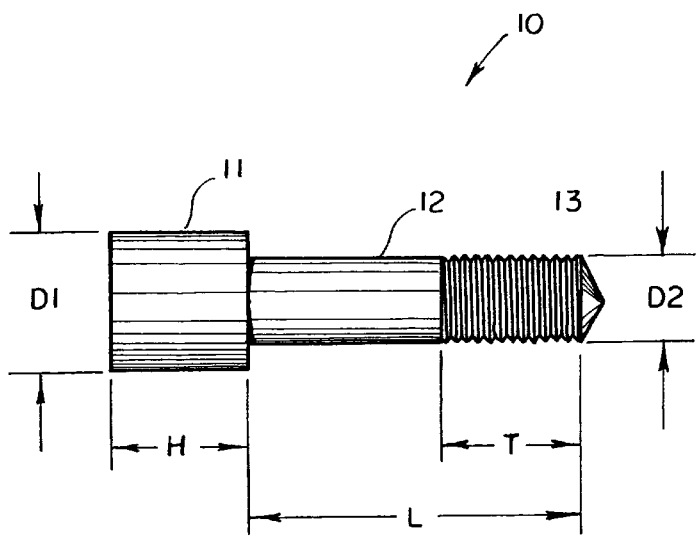
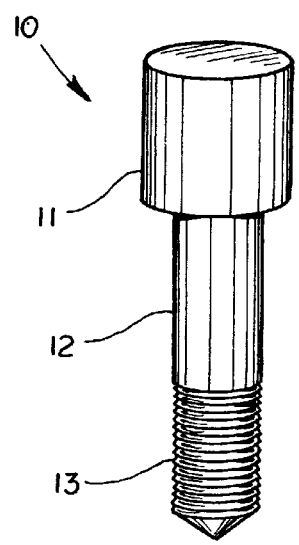
FIG. 1A
FIG. 1B
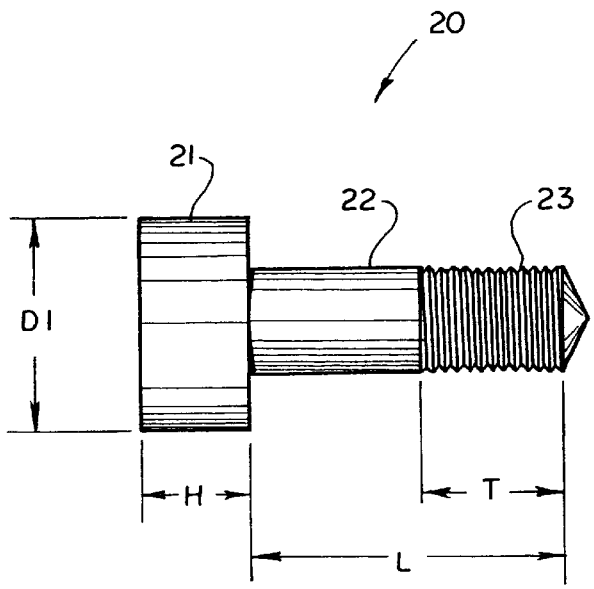
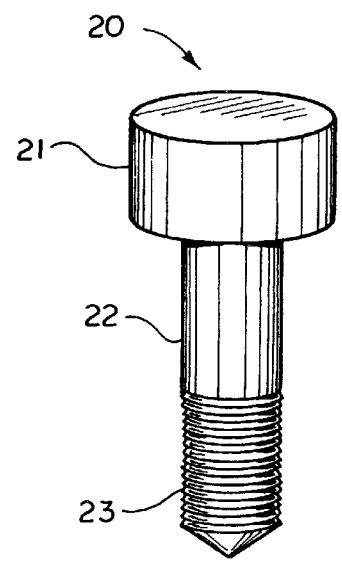
FIG. 2A
FIG. 2B

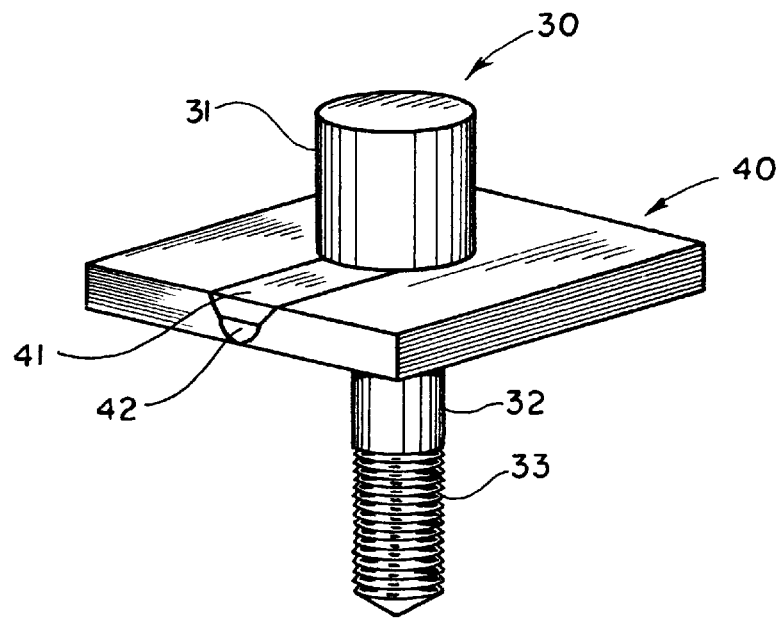
F I G. 3
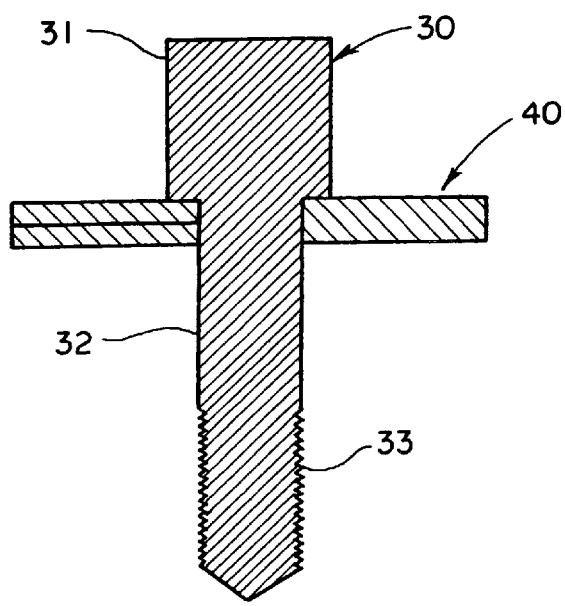
F I G. 4

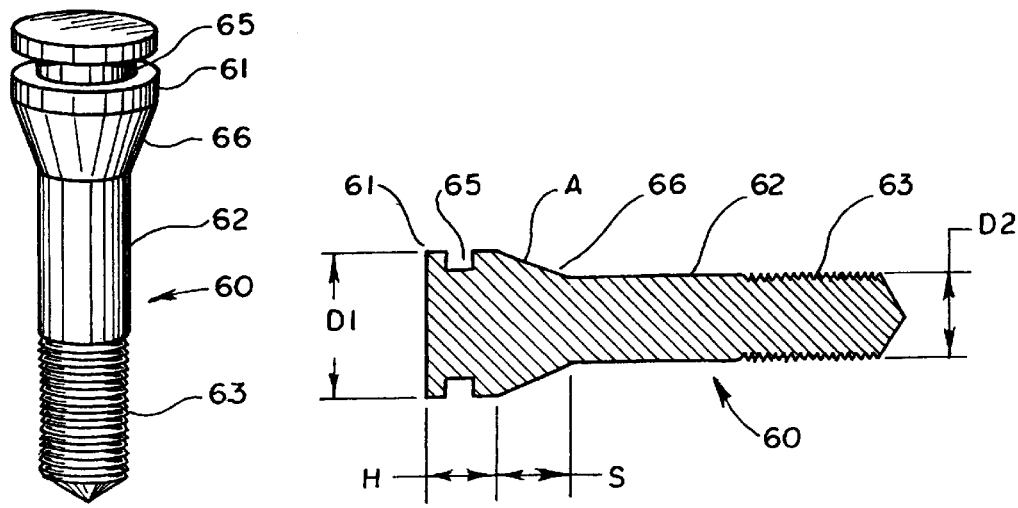
F I G. 6A    F I G. 6B
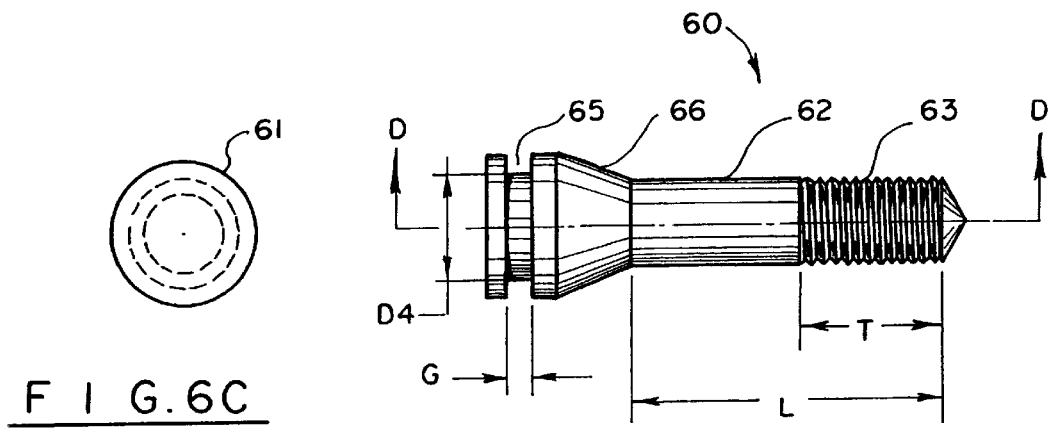
F I G. 6C    F I G. 6D

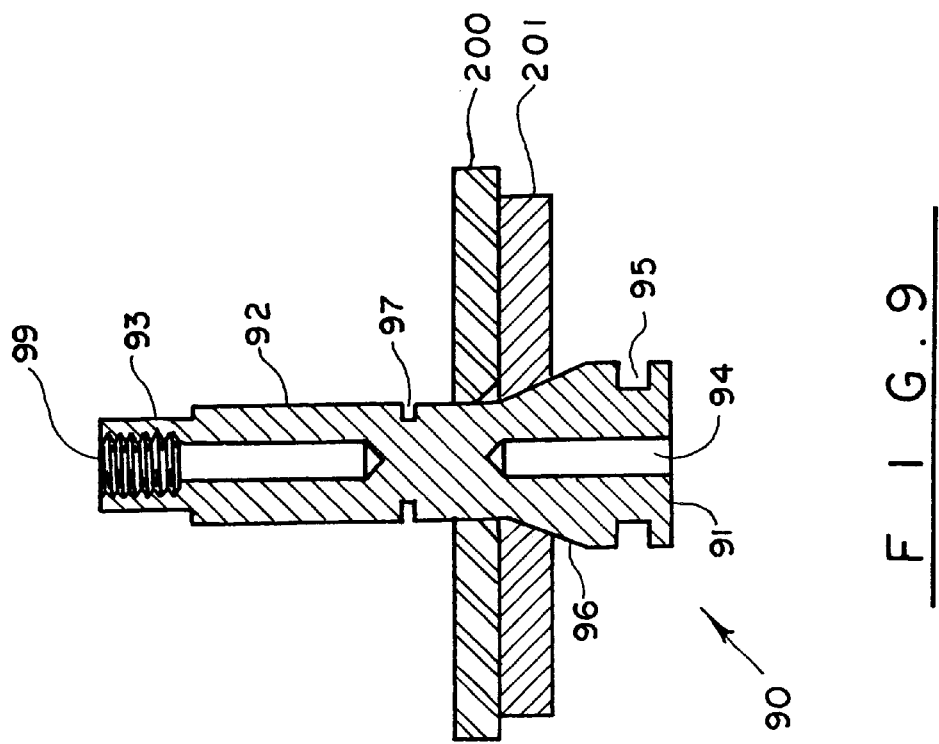
F I G. 9
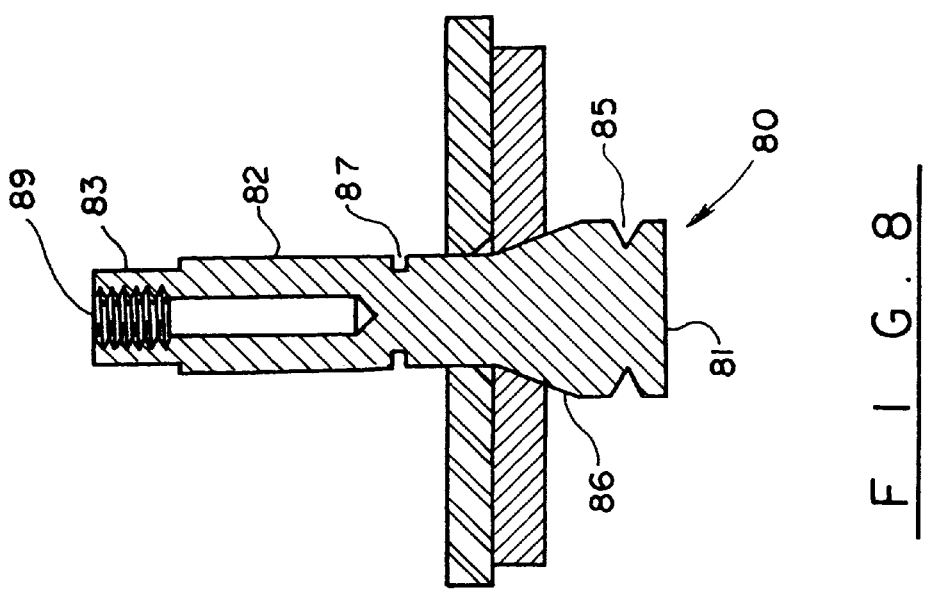
F I G. 8

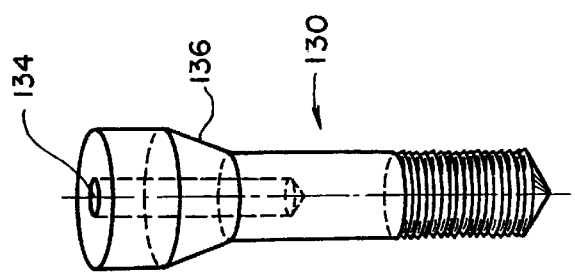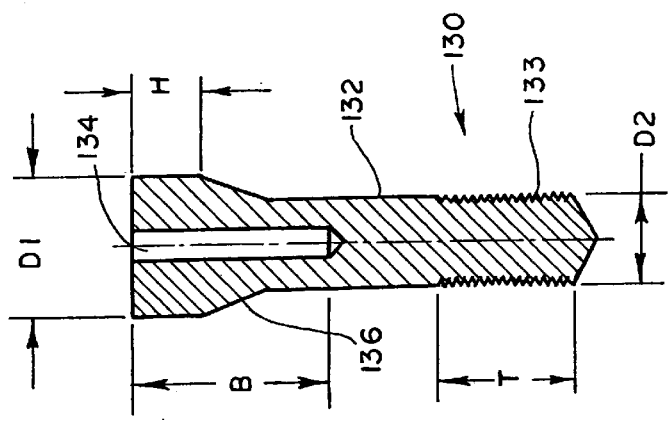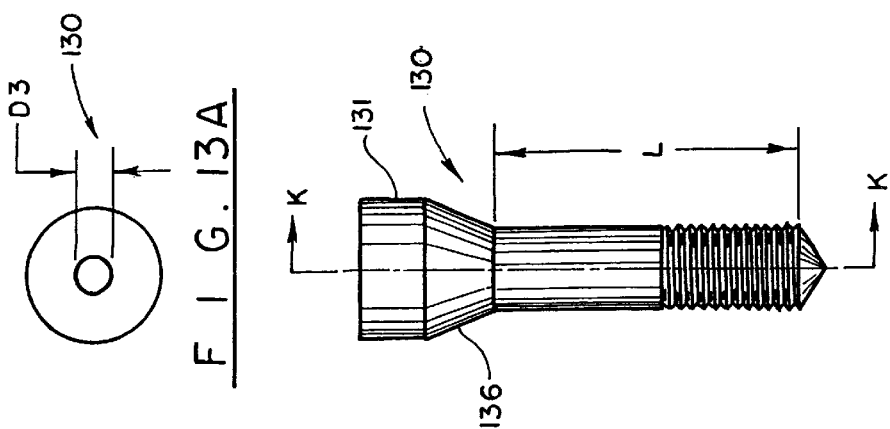

FRICTION PLUG WELDING

CROSS-REFERENCE TO RELATED APPLICATIONS

Priority of our U.S. Provisional Patent Application Ser. No. 60/057,111, filed Aug. 27 1997, now abandoned incorporated herein by reference, is hereby claimed. Also incorporated herein by reference is U.S. Provisional Patent Application Ser. No. 60/077,296, filed Mar. 6, 1998 now abandoned.

STATEMENT REGARDING FEDERALLY SPONSORED RESEARCH OR DEVELOPMENT

The invention claimed herein was developed using independent research funds of Lockheed Martin Corporation, but some of the subject matter described herein was made in the performance of work under NASA Contract No. SDS 3751 and may be subject to the provisions of Section 305 of the National Aeronautics and Space Act of 1958 (42 U.S.C. Section 2457).

REFERENCE TO A "MICROFICHE APPENDIX"

Not applicable

BACKGROUND OF THE INVENTION

1. Field of the Invention

The present invention relates to friction welding. More particularly, the present invention relates to friction plug welding.

2. General Background of the Invention

Friction plug welding (FPW), also referred to as plug welding and friction taper plug welding (FTPW), is a process in which initial defective weld material is located, removed and replaced by a tapered plug, which is friction welded into place. This process is similar to friction stud welding, in which a plug is welded to the surface of a plate, end of a rod, or other material. The primary difference is that FPW is designed to replace a relatively large volume of material containing a defect whereas friction stud welding is a surface-joining technique.

Friction plug welding could be used to repair weld defects in a wide variety of applications; however, it would most likely be used where weld strength is critical. This is due to the fact that manual weld repairs result in strengths much lower than original weld strengths, as opposed to friction plug welds (FPWs) whose typical mechanical properties exceed that of the initial weld. In applications where high strength is not required, manual welding would be less expensive and would not require specialized equipment.

An extension of FPW is known as stitch welding or friction tapered stitch welding (FTSW) and has been developed to repair defects longer than what a single plug can eliminate. Stitch welding is the linear sequential welding of several plugs such that the last plug weld partially overlaps the previous plug. Defects of indefinite length can be repaired with this process, limited only to the time and cost of performing multiple plug welds. These welds have undergone the same testing procedures as single FPWs, including NDI and destructive evaluation. The strengths for stitch welds are similar to those for single plug welds.

Stagger stitch welding is a process best defined as stitch welding in a non-linear fashion. Areas wider than one plug length can be completely covered by staggering plugs side to side as they progress down the length of an initial weld. This process is being developed for plug welds whose minor diameter is on the crown side of the initial weld, and where replacement of the entire initial weld is desired.

While friction plug welding might be a preferred method of repairing defects or strengthening initial welds, there are some applications where heretofore it has been extremely difficult to use friction plug welding. The main cause is due to the logistics of setting up the equipment and/or support tooling to perform friction plug welding, and the geometry of the workpiece to be welded. The following are incorporated herein by reference: U.S. Pat. Nos. 3,853,258, 3,495, 321, 3,234,643, 4,087,038, 3,973,715, 3,848,389, 5,460, 317; British Patent Specification No. 575,556; SU Patent No. 660,801; German Patent No. 447,084, "New Process to Cut Underwater Repair Costs", TWI Connect, No.29, January 1992; "Innovator's Notebook", Eureka Transfer Technology, October 1991, p. 13; "Repairing Welds With Friction-Bonded Plugs", NASA Tech. Briefs, September 1996, p. 95; "Repairing Welds With Friction-Bonded Plugs", Technical Support Package, NASA Tech. Briefs, MFS-30102 (copy enclosed with the provisional patent application); "2195 Aluminum-Copper-Lithium Friction Plug Welding Development", AeroMat '97 Abstract; "Welding, Brazing and Soldering", Friction welding section: "Joint Design", "Conical Joints", Metals Handbook: Ninth Edition, Vol. 6, p. 726.

BRIEF SUMMARY OF THE INVENTION

The present invention solves the problems confronted in the art in a simple and straightforward manner. What is provided is a method of friction plug welding an article, comprising: making a hole in the article; inserting a plug into the hole; and pulling on the plug while spinning the plug relative to the article. Preferably the plug is pulled also after the spinning stops, with a load the same as or different from the load while spinning. The plug and the article can be made of the same material or of different materials. The mechanical properties of the weld of the present invention usually exceed those of the initial weld which it is repairing (when used to repair welds). The article can be equipment intended for use in extremely high temperatures and extremely low (down to −423 degrees F., for example). Preferably, the hole is tapered and the plug is tapered, causing a welded interface through the thickness of the plate, and which consists of such a geometry to create a force opposing the axial load induced by the weld system. In one condition that has been tested, the taper angle of the hole and the taper angle of the plug are equal and of the same orientation, causing near simultaneous contact over a large portion of the hole's surface and plug. This profile generally causes near equal heating time over the majority of the weldment's surface but causes a relatively large amount of cold friction when the plug and the article (workpiece) being welded initially contact. This relatively large frictional force must be overcome with high amounts of spindle torque to maintain rotation. Simultaneous heating of a large weld interface requires large amounts of power, however after the typical duration of less than one second has passed, this power requirement is rapidly reduced due to the development of a plasticized (heated to the point of having fluid like or viscous properties) layer at the weld interface. In another condition that has been tested, the tapers are of the same orientation but of slightly different angles. When this geometrical relationship between the plug and hole and/or the surrounding area exists, the surface areas that initially make contact are relatively small, and plasticization of this area of material requires less total energy. Plasticized material of this area is extruded, or moved from its original location due to the forces involved in performing the weld process, and causes an apparent lubricating affect on the remainder of the weld joint which is heated as the welding process continues.

Significantly less rotational power, primarily torque, is required to perform a weld with the aforementioned geometrical properties, and sound weldments can still be produced.

The present invention also includes the apparatus for carrying out the method of the present invention, as well as the article produced by the method of the present invention. The present invention relates to friction plug welding of aluminum alloys and to a new method of friction plug welding which we call friction plug pull welding.

The plug of the present invention could have a bore into which one could insert cooling fluid.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1A is a side view of an embodiment of the plug apparatus of the present invention;

FIG. 1B is an isometric view of the preferred embodiment of the apparatus of the present invention;

FIG. 2A is a side view of a second embodiment of the plug apparatus of the present invention;

FIG. 2B is an isometric view of the second embodiment of the apparatus of the present invention;

FIG. 3 is an isometric view of a third embodiment of the present invention;

FIG. 4 is a sectional view of the third embodiment of the present invention;

FIG. 6A is an isometric view of a fifth embodiment of the apparatus of the present invention;

FIG. 6B is a section of the fifth embodiment of the apparatus of the present invention;

FIG. 6C is a top view of the fifth embodiment of the apparatus of the present invention;

FIG. 6D is a side view of the fifth embodiment of the apparatus of the present invention;

FIG. 8 is a sectional view of a seventh embodiment of the apparatus of the present invention;

FIG. 9 is a sectional view of an eighth embodiment of the apparatus of the present invention;

FIG. 13A is a top view of a eleventh embodiment of the apparatus of the present invention;

FIG. 13B is a side view of the eleventh embodiment of the apparatus of the present invention;

FIG. 13C is a section of the eleventh embodiment of the apparatus of the present invention through section line K—K of FIG. 13B;

FIG. 13D is an isometric exploded view of the eleventh embodiment of the apparatus of the present invention.

DETAILED DESCRIPTION OF THE INVENTION

Figures 5A, 5B:
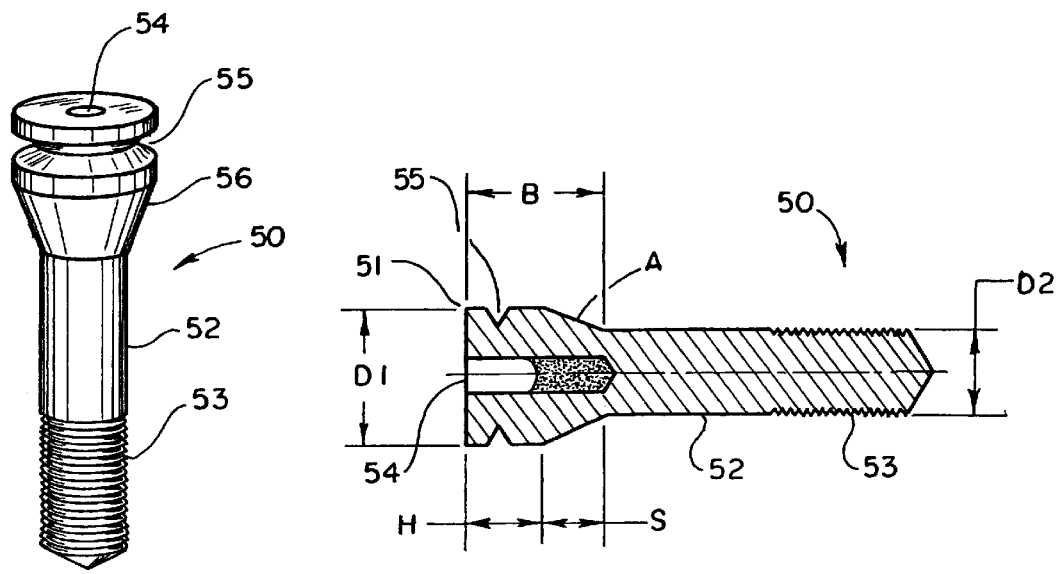
FIG. 5A is an isometric view of a fourth embodiment of the apparatus of the present invention.
FIG. 5B is a section of the fourth embodiment of the apparatus of the present invention.
Figures 5C, 5D:
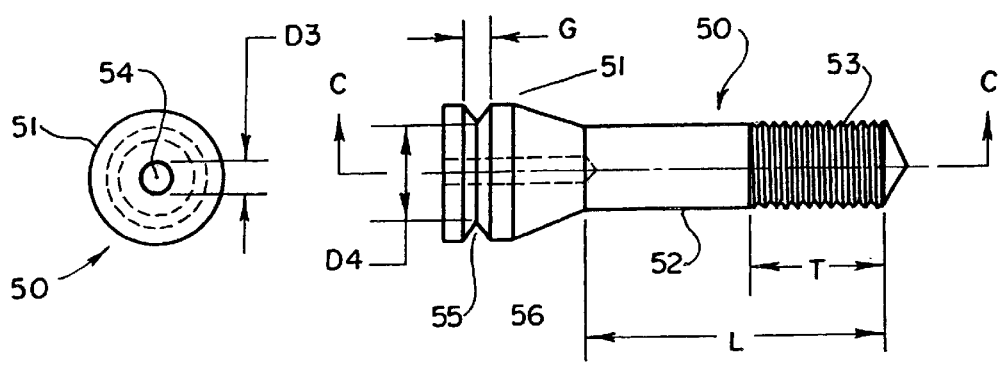
FIG. 5C is a top view of the fourth embodiment of the apparatus of the present invention.
FIG. 5D is a side view of the fourth embodiment of the apparatus of the present invention.
Figure 7D:
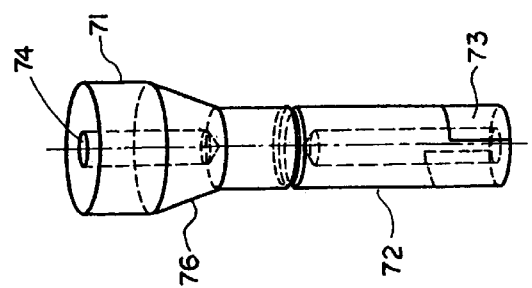
FIG. 7D is an isometric view of the sixth embodiment of the apparatus of the present invention.
Figure 7C:
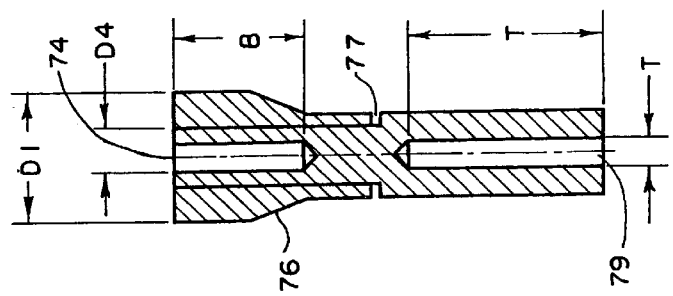
FIG. 7C is a section of the sixth embodiment of the apparatus of the present invention.
Figure 7A:
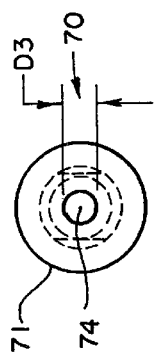
FIG. 7A is a top view of a sixth embodiment of the apparatus of the present invention.
Figure 7B:
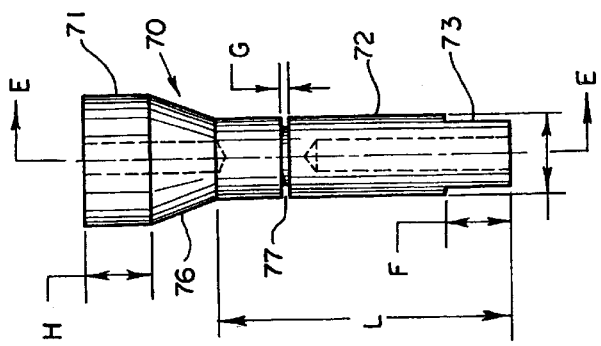
FIG. 7B is a side view of the sixth embodiment of the apparatus of the present invention.
Figure 10D:
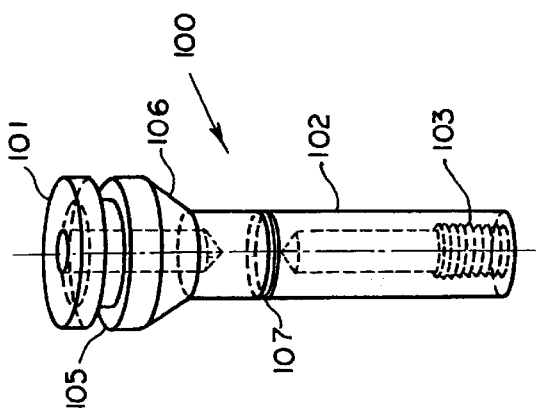
FIG. 10D is an isometric view of the ninth embodiment of the apparatus of the present invention.
Figure 10C:
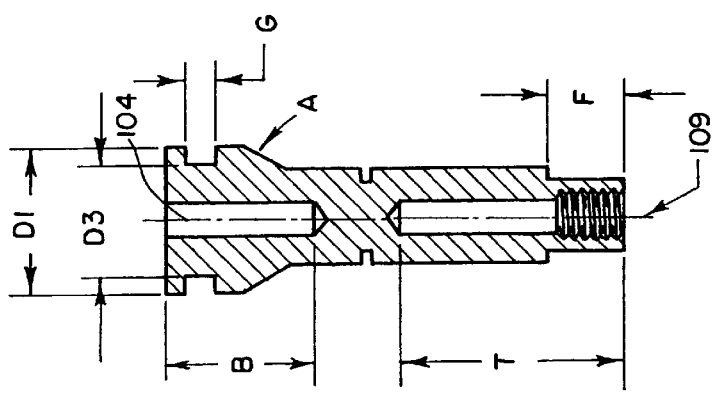
FIG. 10C is a section of the ninth embodiment of the apparatus of the present invention through section line G—G of FIG. 10.
Figure 10A:
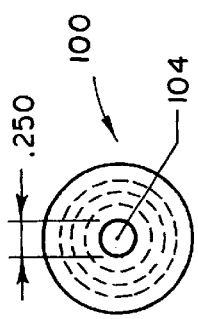
FIG. 10A is a top view of a ninth embodiment of the apparatus of the present invention.
Figure 10B:
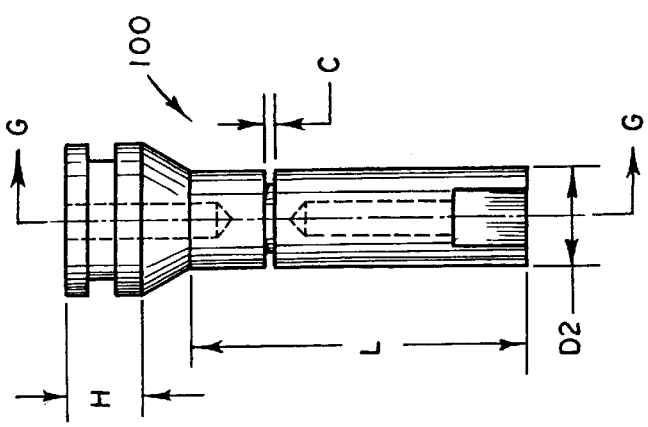
FIG. 10B is a right side view of the ninth embodiment of the apparatus of the present invention.

The present invention includes a method of friction plug welding an article, comprising several stages. Preferably, the first stage is making a hole that is preferably tapered in the article to be welded, although machining a tapered hole is not necessarily required in friction plug push welding where (in certain situations generally characterized when the article to be welded is softer (having lower hardness) relative to the harder (having higher hardness) plug) the plug will form a hole, self bore or imbed into the material either while rotating or not. A tapered plug is then inserted through the tapered hole, then the plug is attached to a chuck of a motor which can both pull on the tapered plug and rotate it. Some connection means, such as threads or locking retention interface, are provided on the tapered plug to facilitate pulling the plug. The second stage, or heating cycle is always required to weld the plug to the article. This stage preferably consists of rotating the plug while pulling (placing the plug in tension axially) into intimate contact with the hole's surface, or region surrounding the hole. Other forms of heating may also be utilized, including but not limited to, using electricity to assist in the heating process, or vibrational energy such as oscillatory rotation rather than the preferred method of continuous rotation, or lateral, axial or some combination thereof, rapid displacement (such as ultrasonic welding) to impart sufficient energy to assist in the heating the weldment. The plug (preferably tapered, with a taper the same as or preferably different from the taper of the hole (if it is tapered), and rotating the plug relative to the part while moving the plug in the direction such to make contact with the hole's surface, until contact is made, and forcing the plug into the surface of the hole by pulling on the plug (imposing a tensile force in the plug in the plug's axial direction) all while continuously spinning the plug relative to the article. The weld continues to. The third stage is the braking stage. This rapid deceleration of rotation, if rotation is used, or otherwise defined as rapid decline of energy input to zero or near zero, is necessary to performing a successful weld. Preferably, the fourth stage which is also referred to as the forging stage, is a period of cooling in which no further heating energy is intentionally applied to the weldment and energy in the form of heat is dissipated. During this stage, it is preferable to maintain either the same axial tensile load, or a different axial tensile load whether that be greater or lesser, to cause densification and or maintain or create a sound metallurgical bond or weldment. In the current application, although not necessarily required in other applications, excess sections of the plug are cut off and material further removed via grinding and sanding to make it smooth with the initial weldment and/or surrounding materials' surfaces. The present invention also includes the plug.

The typical maximum temperature for this process, using typical process parameters, using aluminum alloys is 900° F. as measured by an embedded thermocouple located within 0.100" from the original interface at an approximate depth of 33% to 50% through the substrate's thickness. The first cycle ends after a pre-programmed time (typically less than 5 seconds, preferably from 0.25 seconds to 2 seconds, more preferably from 0.5 seconds to 2 seconds, and most preferably in about 1 second), displacement during heating (also referred to as 'burn-off') (typically 0.010 inches to 0.5 inches, preferably 0.025 inches to 0.250 inches, more preferably 0.050 inches to 0.150 inches, and most preferably 0.075 inches to 0.125 inches), or temperature (typically 500° F. to 1000° F., preferably 700° F. to 1000° F. as measured with an imbedded thermocouple within 0.1" of the original interface buried up to a depth of about 50% through the substrate's thickness. The forging phase for our current typical weld geometry exerts an axial tensile load of typically 1000 pounds to 20,000 pounds, preferably 6000 pounds to 15,000 pounds, more preferably 8000 pounds to 12,000 pounds, and most preferably 9000 pounds to 11,000 pounds, as the weld cools. After several seconds, (typically less than one minute, preferably about 5 seconds), the weld has cooled sufficiently to remove the tensile load and remove the tooling and weld equipment FPW hole geometries are an important factor to creating a successful weld. The current hole is made by mechanically removing the weld bead flush to the top and bottom sides or the surrounding plate or sheet, drilling a pilot hole, and counter sinking with a counter sink cutter. The current included angle is typically 20° to 120°, preferably 40° to 90°, and most preferably 40° to 60°, although it is possible to perform similar welds with no angle (a straight bored hole), or opposite bored tapers (those which the taper of the plug and hole are opposing each other). See the Figures. The hole is drilled to a depth such that the minor diameter is approximately the same as the diameter of the plug's shaft. The major diameter of the plug is typically equal to or greater than the major diameter of the hole. Current shaft diameters have ranged from ⅝" to ¾" in diameter; however, diameters ranging from between 1" and 1.5" are planned. Current plug major diameters (the diameter on the larger side of the taper) typically range from ¾" to 1", but have been made less than ¾" and may be made in excess of 1.5".

The backing support (also referred to as a pressure foot or collet) is another important aspect in forming a successful weld. It reacts the axial load, and also serves as a reservoir to contain the extruded flash. The depth, diameter and profile of this support are optimized for each set of conditions, e.g. weld parameters, plug/hole geometrical design, plate thickness, etc., and is important in creating a defect-free weld. In the pull method, the backing support (also referred to as a pressure foot) consists of a collet of an appropriate diameter and geometry. Currently, the diameter of the collet is larger than the shaft of the plug that passes through it by at least 0.002", typically from 0.002" to 0.100", and preferably from 0.010" to 0.050". The profile of the collet may include a bevel, taper, groove or other type of depression to act as a reservoir for plasticized material to flow. Successful welds have been made with backing supports with beveled edges and without beveled edges. Examples of several backing plates are shown in FIGS. 8, 9, and 14A–17B.

The advantage of pulling instead of pushing is that all equipment can be placed on one side of the object being repaired (such as the rather large and fragile external tank of the space shuttle). This makes the logistics of performing a plug weld much easier in some cases than if standard plug push welding were to be performed.

In the preferred embodiment of the method of the present invention, a tapered hole is drilled from one side of the article being repaired. A tapered plug is then inserted through the tapered hole, then the plug is attached to a chuck of a motor which can both pull on the tapered plug and spin it. Some connection means, such as threads or locking retention interface, are provided on the tapered plug to facilitate pulling the plug. The plug is pulled while spun by the motor. Preferably the plug is pulled also after the spinning stops, with a load the same as or different from the load while spinning. After the spinning has taken place and the plug is welded in place, the excess part of the plug is cut off and the weld machined down to make it smooth. Pulling a tapered plug during plug welding allows all equipment, including a backing plate, to be on one side of the article being welded. Pull welding eliminates the need for large backing structures that must react high loads associated with friction plug push welding, often exceeding 10,000 pounds force, while at the same loads deflect an amount often less than 0.25 inches. The present inventors use or contemplate using plug welding (push and/or pull) with 2195 Al—Cu—Li alloy and 2219 Al—Cu alloy.

Development of plug welding at LMMSS has included plugs of extruded Al—Cu—Li 2195 in the T3 and T8 condition welded into (1) Al 2195-T8 sheet, extrusion and plate, (2) 2195-T8/2195-T8 fusion welded sheet, extrusion and plate with Al 4043 filler wire, (3) 2195-T8/2219-T8 fusion welded sheet, extrusion and plate with Al 4043 filler wire, (4) friction stir welded 2195-T8/2195-T8 sheet and plate, where all sheets and plates were of thicknesses greater than 0.12" and no greater than 1.00" and all plugs were a diameter between 0.500" and 1.000".

It has been discovered that a groove in the enlarged diameter portion of the plug can help improve the performance of the present method. Tests have shown that a plug containing a groove whose size, profile and locations have varied widely, but have the general shape, profile and location of ⅛" to ¼" deep groove, with a 'Vee', 'Square', or 'U' bottom, ⅛" to ¼" beyond the end of the taper, increases the strength and reliability of the weld and is also believed to contribute to the elimination of all weld defects, surface or internal. It is believed that this is so because the groove interrupts heat transfer away from the weld interface and/or allows deformation of the welding surface portion of the plug. The core of the plug is unaffected by the groove, but is beneficial to the weld process in that it is believed to contribute to the dissipation of heat from the plug's core, where low temperatures are preferred to help maintain structural integrity, both tensile and torsional.

A hydraulically powered direct drive weld system has been used for all current development at Lockheed Martin; however, an electrically powered direct drive, or inertia drive weld system may also be used.

The inventors have discovered that satisfactory welds occur most frequently when the plug diameter is large enough to maintain a mechanically stable cool core. For this reason, plug diameters have continued to increase, and more powerful weld equipment has been acquired. Techniques have been developed to weld larger diameter plugs while minimizing the required motor power. One such discovery entails varying the axial stroke rate during the weld process to decrease the initial contact friction. In this process, it is preferable for the plug and article to contact slowly, thereby reducing the rotational friction at contact. After the boundary between the plug and article plasticizes, then it is preferable, although not required, to increase the stroke rate, thereby increasing the rate of heating at the interface to achieve weld temperatures. This discovery significantly reduces the required power to perform welds, and is advantageous in performing large welds whose power requirement exceeds that which the system is designed to deliver. It has been found that for our current equipment and process, for example, a plug having an initial contact diameter of 0.5" to 0.75" can be pulled at an initial stroke rate of 15 inches per second and perform well, but larger plugs whose contact diameter is 0.75" to 1.0" best perform when pulled at an initial stroke rate of 5 to 10 inches per second.

Lockheed Martin has found that with its current equipment and process, the preferable operating range at which to rotate the plug is 4000–6000 rpm prior to contact between the plug and hole's surface, and it is also preferable to maintain a minimum of 3000 rpm during the duration of the heating cycle. Successful welds have been created at much slower speeds, as low as but not limited to 1000 rpm prior to contact and as high as, but limited only by the equipment capability, of about 7000 rpm prior to contact.

The plug of the present invention preferably has a connection means comprising a standard external thread. The thread can be, for example, right-hand ⅝" with 18 threads per inch. Other methods for holding the plug in the chuck may also include internal threads and key grooves or flats.

The first embodiment 10 of the plug apparatus of the present invention is shown in FIGS. 1A and 1B. Plug apparatus 10 includes a plug portion 11, a shaft 12, and a threaded portion 13.

The second embodiment 20 of the plug apparatus of the present invention is shown in FIGS. 2A and 2B. Plug apparatus 20 includes a plug portion 21, a shaft 22, and a threaded portion 23.

The third embodiment 30 of the plug apparatus of the present invention is shown in FIGS. 3 and 4. Plug apparatus 30 includes a plug portion 31, a shaft 32, and a threaded portion 33. Plug apparatus 30 is shown welded to a plate 40 at the termination of a plasma weld including a plasma weld crown pass 41 and a plasma weld root pass 42. Similarly, a friction stir weld (or any weld) could be used in place of the plasma weld.

A fourth embodiment of the apparatus of the present invention, plug apparatus 50, is shown in FIGS. 5A–5D. Plug apparatus 50 includes a plug portion 51, a shaft 52, a threaded portion 53, a bore 54, a V-shaped groove 55, and a tapered portion 56. Bore 54 extends downward to about the top of the taper 56 (preferably no deeper than dimension H in FIG. 5B. Bore 54 could be used to inject cooling fluid during the weld cycle.

A fifth embodiment of the apparatus of the present invention, plug apparatus 60, is shown in FIGS. 6A–6D. Plug apparatus 60 includes a plug portion 61, a shaft 62, a threaded portion 63, an annular, straight-walled groove 65, and a tapered portion 66.

A sixth embodiment of the apparatus of the present invention, plug apparatus 70, is shown in FIGS. 7A–7D. Plug apparatus 70 includes a plug portion 71, a shaft 72, a notched motor-gripping portion 73, a bore 74, a tapered portion 76, a shear portion 77, and an internally threaded bore 79 for pulling.

A seventh embodiment of the apparatus of the present invention, plug apparatus 80, is shown in FIG. 8. Plug apparatus 80 includes a plug portion 81, a shaft 82, a notched motor-gripping portion 83, a V-shaped groove 85, a tapered portion 86, a shear portion 87, and an internally threaded bore 89 for pulling.

An eighth embodiment of the apparatus of the present invention, plug apparatus 90, is shown in FIG. 9. Plug apparatus 90 includes a plug portion 91, a shaft 92, a notched motor-gripping portion 93, a hole 94, an annular groove 95, a tapered portion 96, a shear portion 97, and an internally threaded bore 99 for pulling. Plug apparatus 90 is shown with repair plate 201 and backloging plate 200.

A ninth embodiment of the apparatus of the present invention, plug apparatus 100, is shown in FIGS. 10A–10D. Plug apparatus 100 includes a plug portion 101, a shaft 102, a notched motor-gripping portion 103, a hole 104, an annular groove 105, a tapered portion 106, a shear portion 107, and an internally threaded bore 109 for pulling.

Figure 11:
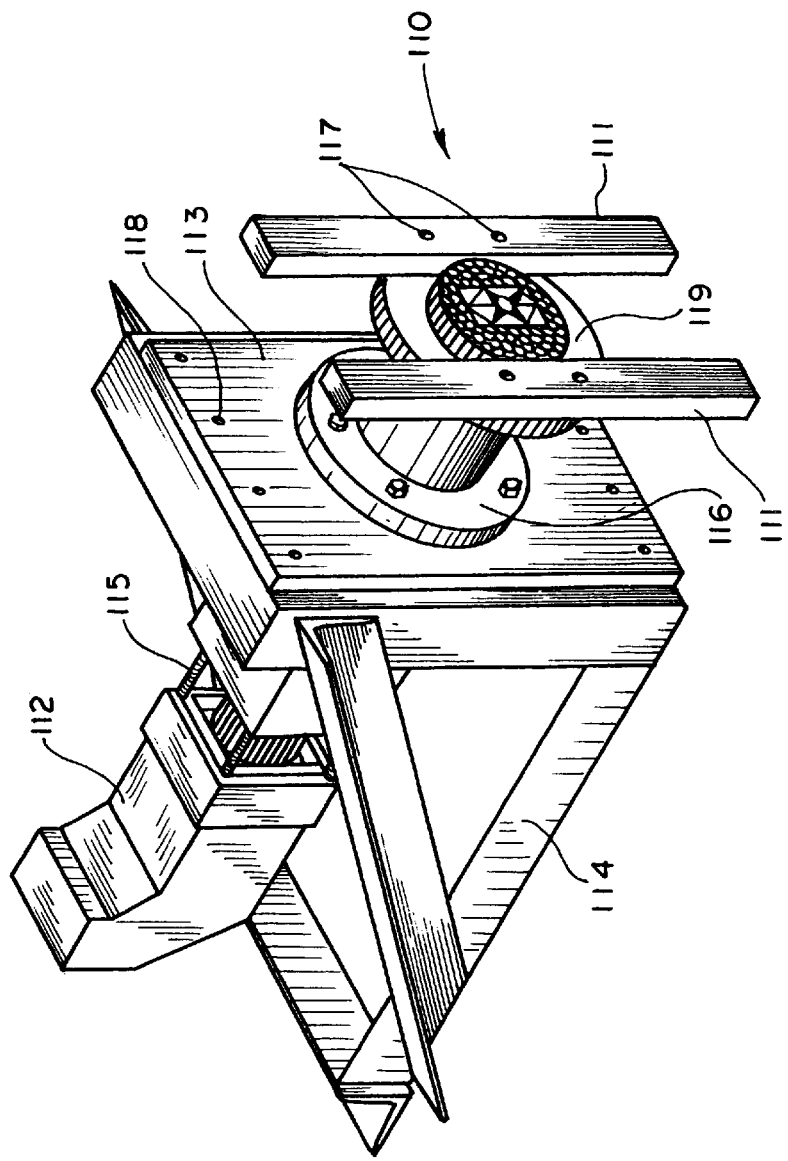
FIG. 11 is an isometric view of an embodiment the pulling and spinning apparatus of the present invention.
Figure 12D:
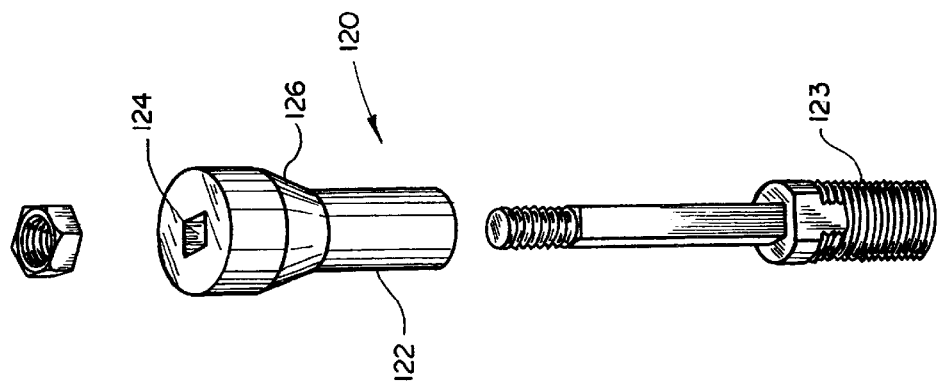
FIG. 12D is an isometric exploded view of the tenth embodiment of the apparatus of the present invention.
Figure 12C:
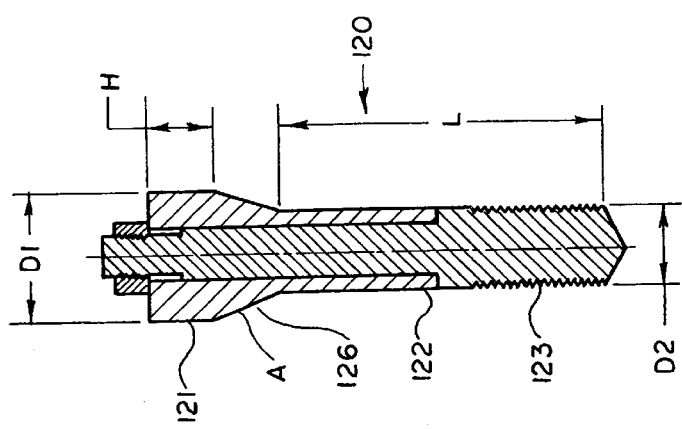
FIG. 12C is a section of the tenth embodiment of the apparatus of the present invention through section line J—J of FIG. 12B.
Figure 12A:
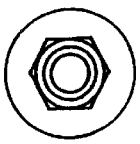
FIG. 12A is a top view of a tenth embodiment of the apparatus of the present invention.
Figure 12B:
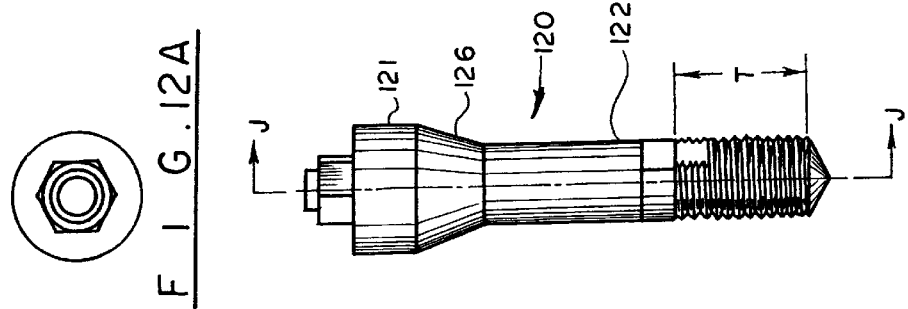
FIG. 12B is a right side view of the tenth embodiment of the apparatus of the present invention.

FIG. 11 is an isometric view of an embodiment the pulling and spinning apparatus of the present invention. Friction pull plug welding apparatus 110 includes steel bars 111 for clamping workpieces, a hydraulic motor 112, a mounting plate 113, support frame 114, hydraulic cylinder 115, stand off housing 116, bolts 117, bolts 118, and pressure foot 119. The chuck (not shown) is contained within housing 116.

A tenth embodiment of the apparatus of the present invention, plug apparatus 120, is shown in FIGS. 12A–12D. Plug apparatus 120 includes a plug portion 121, a shaft 122, a threaded motor-gripping portion 123, a bore 124, and a tapered portion 126. The hole 124 extends through the plug portion 121 so it will extend through the workpiece when the welding is completed. Plug apparatus 120 can be bolted together, and the various parts can be made of the same or dissimilar materials.

An eleventh embodiment of the apparatus of the present invention, plug apparatus 130, is shown in FIGS. 13A–13D. Plug apparatus 130 includes a plug portion 131, a shaft 132, a threaded motor-gripping portion 133, a hole 134, and a tapered portion 136. The hole 134 extends through the plug portion 131 so it will extend through the workpiece when the welding is completed.

FIGS. 14A–17B are views of various combinations of plug taper and hole taper (though externally threaded plug apparatus is shown, any of the plug apparatus shown in any of the figures could be used in these various combinations).

Figure 14B:
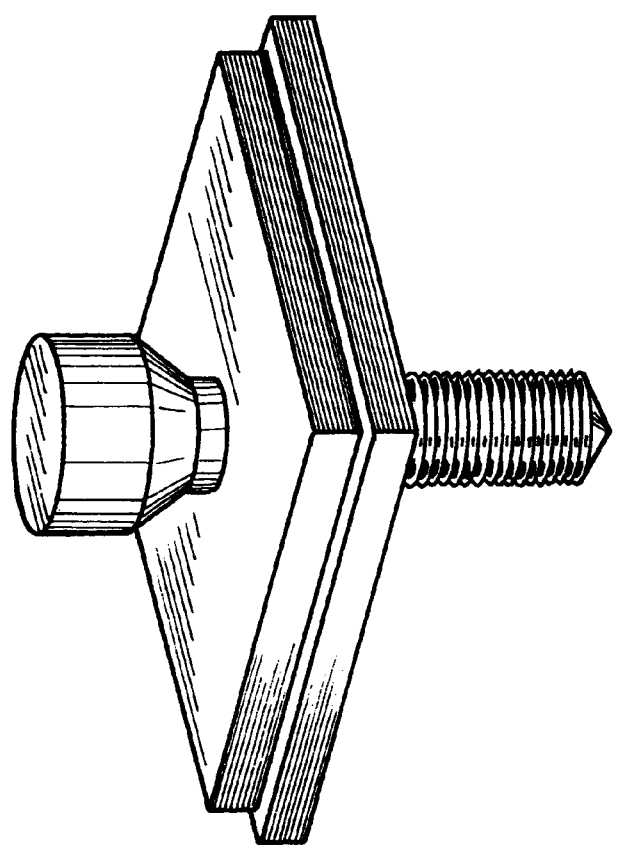
FIGS. 14A–17B are views of various combinations of plug taper and hole taper (though externally threaded plug apparatus is shown, any of the plug apparatus shown in any of the figures could be used in these various combinations).
Figure 14A:
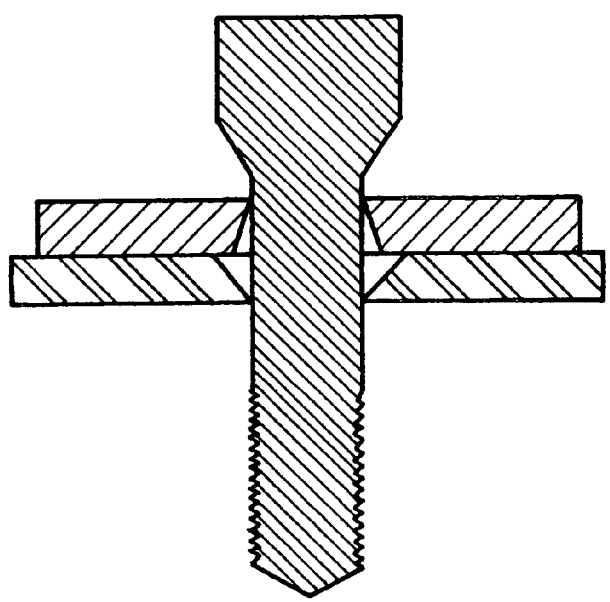
Figure 15B:
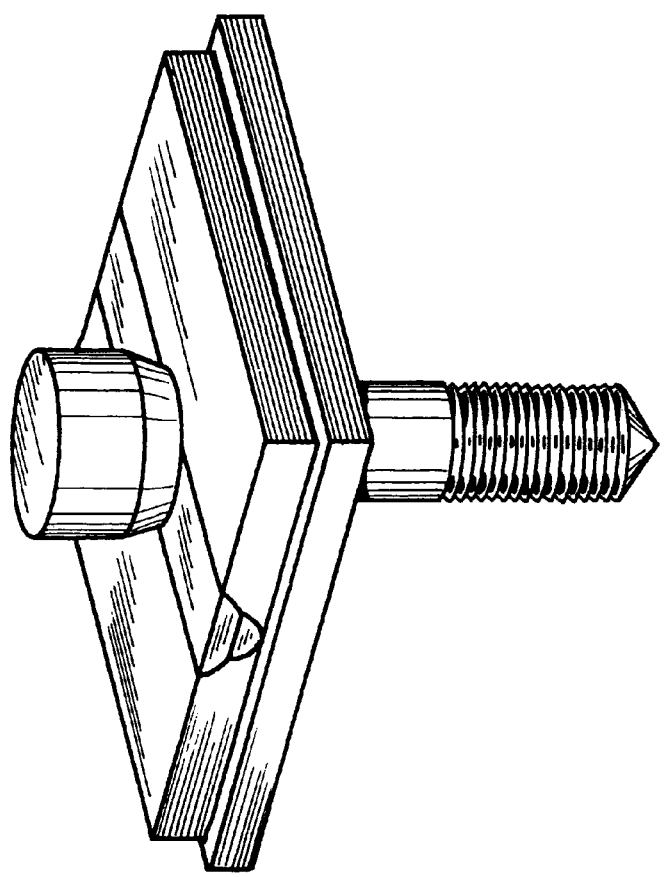
Figure 15A:
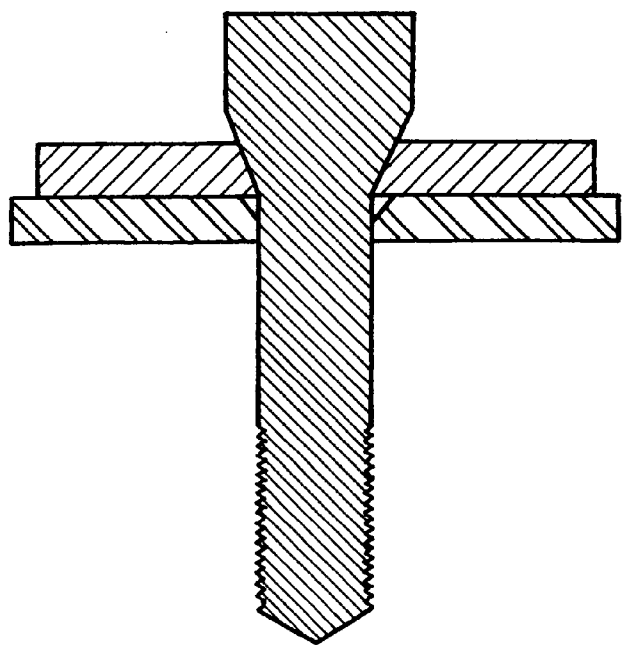
Figure 16B:
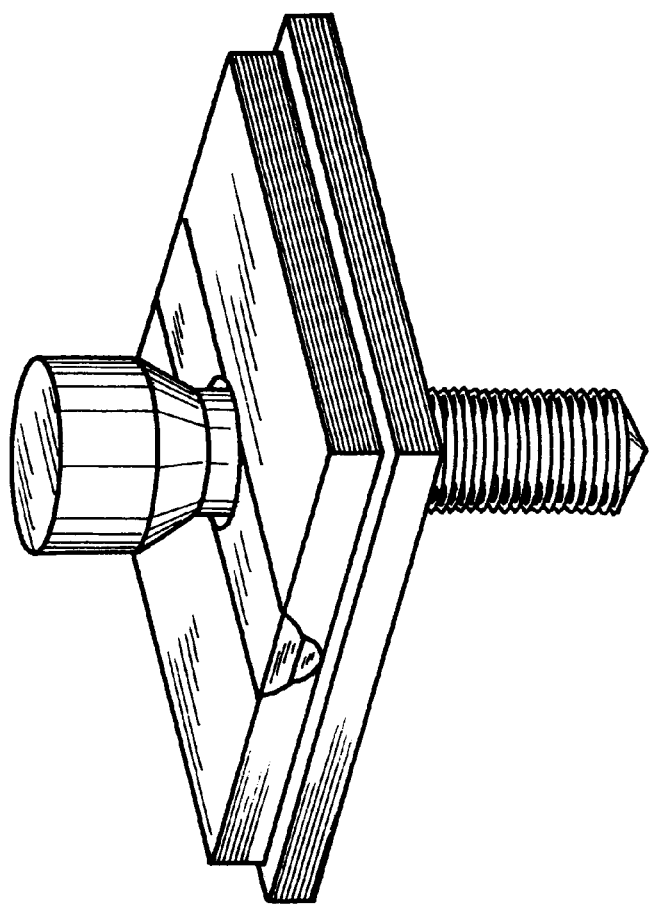
Figure 16A:
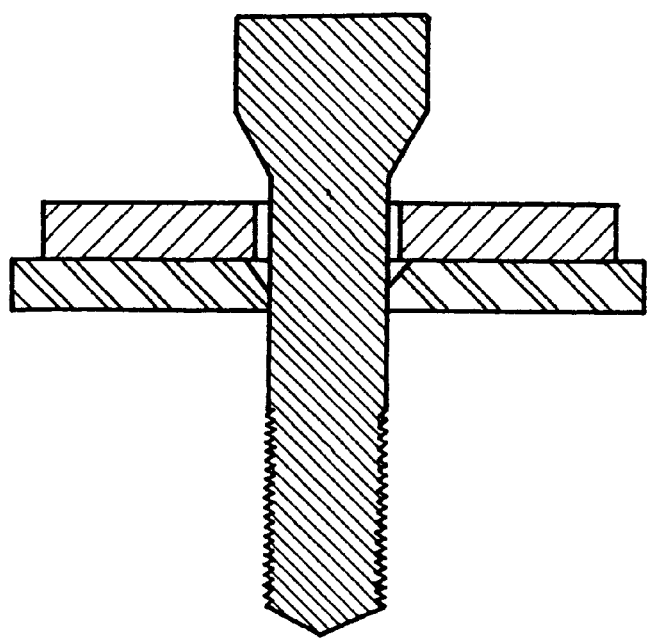
Figure 17B:
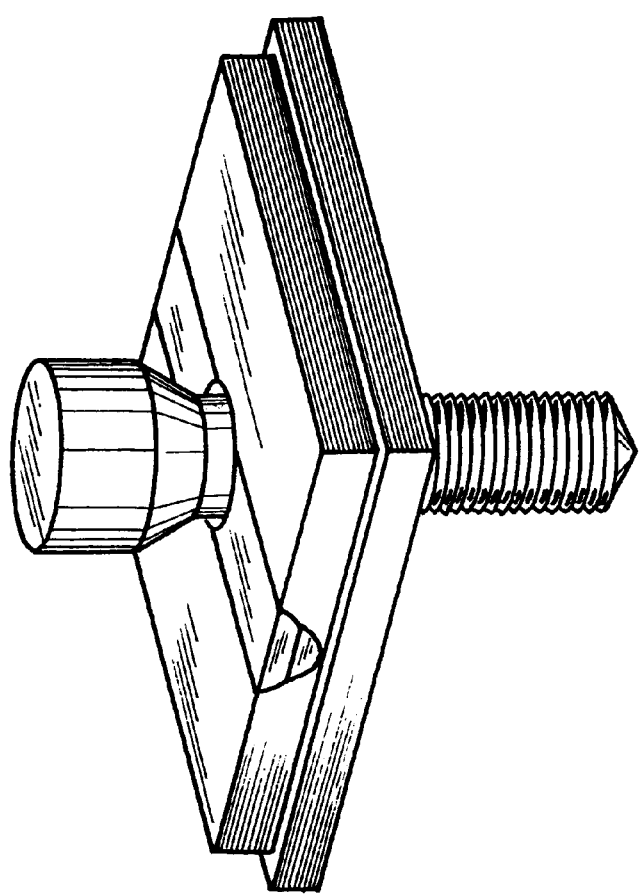
Figure 17A:
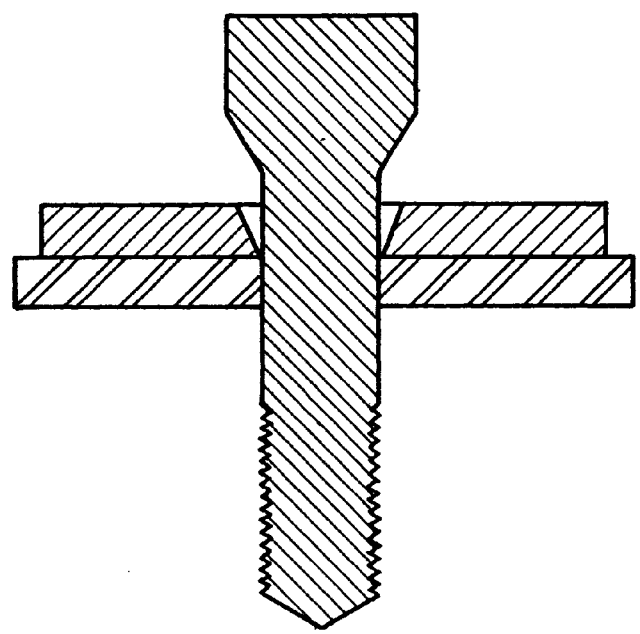

FIGS. 14A and 14B show a ⅝-40 plug, 40° reversed plug, full chamfered backing plate. FIGS. 15A and 15B show a ⅝-40 Plug, 40° weld repair, chamfered backing plate. FIGS. 16A and 16B show a ⅝-40 plug, straight weld repair, chamfered backing plate. FIGS. 17A and 17B show a ⅝-40 Plug, 40° weld repair, non-chamfered backing plate.

The materials of the plug and the workpiece can be different.

The various features of the various plugs can be mixed and matched.

The location of the groove is variable, but the groove is preferably above the finished weld.

Possible Extensions of the Innovation:

This process is intended to be used on production tools to repair weld defects-and repair or fill the close-out hole left by the removal of a stationary pin friction stir weld (FSW) tool as used in performing a friction stir weld.

This process has the potential to deter cracks from forming or repair pre-existing cracks or other defects located in welded material as it is stressed in handling, proof testing, or service. This technique has proven to be successful.

This process could also be used as a technique for the incorporation of inserts into a substrate, welded or otherwise. See FIGS. 10, 12, and 13.

Friction plug welds have been found to be virtually defect-free using various non-destructive inspection (NDI) techniques such as visual inspection, fluorescent dye penetrant, x-ray radiography, ultrasonic and Electromagnetic Acoustic Transducer (EMAT). Mechanical testing has been accomplished using plug pull, and tensile testing. Plug pulls were abandoned due to excessive sample deformation during testing. Tensile tests whose gauge widths have included 0.25", 0.50", 1.0", 1.5", 2", 3", 4", 5", 10" and 20" have been performed at room temperature, –320° F. and –423° F. Strengths of up to 69.8 KSI (70% weld efficiency) at 77° F. and up to 87.6 KSI at –423° F. have been recorded. The ductility of these samples is increased over the initial weld from 4% to 14% elongation as measured over a 1" gauge length (a 250% improvement) and 4.5% to 7% elongation as measured over 2" a gauge length (a 55% improvement). It should be noted that several of the tensile test failures occurred outside the friction weld interface, failing in the original fusion weld's heat affected zone, indicating that the actual strength of the friction weld was probably above that of which these tests show.

Plug welds have been made in initial welds of extremely poor quality with the same success as those listed above. This demonstrates that defects such as porosity and cracks do not affect the properties of FPWs. Furthermore, the parameters of these welds can vary over a broad range and do not greatly affect the FPW quality. Burn off is defined as the amount of displacement during the heating cycle, past the point when the rotating plug makes intimate contact with the hole. Typical values of burn off can range from 0.025" to 0.150". Optimum welding conditions occur in the range of 0.075" to 0.125" burn off for the inventors' current welding equipment; however, changing this amount by as much as 0.050" yields a typical loss in tensile strength of 10% or less. Similarly, reducing the amount of axial load during heating from the optimum 10,000 pounds to as low as 4000 pounds, also results in a loss of strength of less than 10%. Varying parameters such as X and Y alignment of the plug to the hole does not affect weld strength to a certain point, at which degradation does occur. Elimination of the forging cycle seems to have a large effect on FPW strength.

Work on curved surfaces and tapered thicknesses have also been successful.

Equipment similar to that shown and described in U.S. Pat. No. 3,973,715 can be used to make the welds of the present invention, except that thrust bearing 18 would be unnecessary and frame member 12 would be replaced with a backing plate of an appropriate geometry to provide support for the workpiece as the pull plug welding occurs.

EXAMPLE 1

A pull plug weld was performed in a 0.140" thick workpiece of 2195 T8A3 Al—Cu—Li sheet welded to another plate of the same properties using a VPPA weld process using A14043 filler wire with a plug made of 2195 T8 extruded rod. The welded workpiece was prepared by removing weld bead protruding from the both surfaces of the plate with a pneumatic bead shaver and pneumatic sanding wheel until approximately flush with the surface. The plug had a shaft (⅝" diameter), a tapered section (60 degree) that served as the bonding surface to the workpiece, a head portion of enlarged diameter (0.950" diameter) with a groove (0.140" wide and 0.200" deep), and a threaded portion (⅝-18RH) acting as a connection means for removably attaching the plug to the chuck, which acts as the interface to transmit a means of turning and pulling. The hole in the workpiece was 0.140" deep and had a 40 degree taper (the minor diameter of the hole was 0.700"). A backing plate that was approximately 0.150" thick stainless steel and having an opening of 0.710" in diameter was placed adjacent the workpiece and on top of the standard pressure foot 119 (see FIG. 11). The workpiece and backing plate (which served as the collet) were concentrically aligned and clamped to the pull weld test stand with C-clamps. The tool for producing such a weld is shown in FIG. 11. The plug was secured to a chuck which was screwed on to the spindle of the plug weld head. The motor initially spun the plug at a rate of about 5000 rpm, a hydraulic ram pulled on the plug at a rate of about 10 inches per minute until physical contact of the plug and the workpiece was made. The spin rate then decreased by approximately 1000 rpm due to the frictional resistance at the weld interface. The hydraulic ram continued to pull on the plug with a force of about 11,000 pounds until a displacement of 0.100" during the heating cycle was measured. The heating cycle was ceased about 1 to 2 seconds after heating began. At this point, the motor was stopped in approximately 0.2 seconds. At the instant that the motor began to brake (rapidly decrease in speed) and the hydraulic ram pressure was increased to about 13,000 pounds tensile force. This load was maintained on the plug for about another 5 seconds.

The weld was allowed to cool for about 10 seconds. The workpiece and the backing plate were then loosened by removing the c-clamps and the ram was extended to its outmost position, pushing the welded workpiece and plug outward. The plate and plug were manually spun in the opposite direction of rotation to loosen the plug from the chuck. Visual inspection of the weld was performed. Excess plug material was removed using a saw, beadshaver and sanding disc. Nondestructive testing indicated that the strength of the weld was defect free. Mechanical testing of a 1" gauge width sample at 77° F. yielded an acceptable strength of 52 KSI.

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

What is claimed is:

1. A method of friction plug welding an article, comprising:
   (a) making a hole in the article;
   (b) inserting a plug into the hole; and
   (c) pulling on the plug while spinning the plug relative to the article.

2. The method of claim 1, wherein the plug has a tapered portion.

3. The method of claim 1, wherein the hole is tapered.

4. The method of claim 1, wherein the plug and the article are made of the same material.

5. The method of claim 1, further comprising the step of rapidly stopping rotation of the plug.

6. The method of claim 5, further comprising the step of continuing to pull on the plug after rapidly stopping rotation of the plug.

7. The method of claim 5, wherein, after the step of rapidly stopping rotation of the plug, there is a period of cooling in which no further heating energy is intentionally applied to the plug and energy in the form of heat is dissipated.

8. The method of claim 1, further comprising the steps of:
   stopping rotation of the plug; and
   continuing to pull on the plug after stopping rotation of the plug.

9. The method of claim 8, wherein, after the step of stopping rotation of the plug, there is a period of cooling in which no further heating energy is intentionally applied to the plug and energy in the form of heat is dissipated.

10. The method of claim 1, further comprising the steps of:
    stopping rotation of the plug; and
    cutting off excess sections of the plug after the plug stops rotating.

11. The method of claim 10, further comprising the step of:
    grinding or sanding the plug to make it smooth after cutting off excess sections of the plug.

12. The method of claim 1, further comprising the steps of:
    stopping rotation of the plug; and
    continuing to pull on the plug with an axial tensile load of 1000 pounds to 20,000 pounds after stopping rotation of the plug.

13. The method of claim 1, wherein there is a boundary between the plug and the article being welded which plasticizes while the plug is spinning, and the plug is pulled faster after the boundary plasticizes.

* * * * *

UNITED STATES PATENT AND TRADEMARK OFFICE
CERTIFICATE OF CORRECTION

PATENT NO. : 6,213,379 B1
DATED : April 10, 2001
INVENTOR(S) : Riki Takeshita, Paula J. Hartley and Terry L. Hibbard It is certified that error appears in the above-identified patent and that said Letters Patent is hereby corrected as shown below:

<u>Title page</u>
<u>Item (75) should read:</u>

-- (75) Inventors: Riki P. Takeshita, Slidell; Paula J. Hartley, Slidell; Terry L. Hibbard, Kenner, all three of LA (US) --

Signed and Sealed this

Eleventh Day of September, 2001

Attest:

*Attesting Officer*

NICHOLAS P. GODICI
*Acting Director of the United States Patent and Trademark Office*